United States Patent
Park

(10) Patent No.: US 7,984,888 B2
(45) Date of Patent: Jul. 26, 2011

(54) SUPPORTING DEVICE OF A DISPLAY UNIT CAPABLE OF HORIZONTAL AND VERTICAL ROTATION

(75) Inventor: Jae Hoo Park, Suwon-Si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 403 days.

(21) Appl. No.: 11/705,466

(22) Filed: Feb. 13, 2007

(65) Prior Publication Data

US 2007/0221807 A1 Sep. 27, 2007

(30) Foreign Application Priority Data

Mar. 22, 2006 (KR) ......................... 10-2006-0026113
Dec. 22, 2006 (KR) ......................... 10-2006-0132881

(51) Int. Cl.
A47F 5/00 (2006.01)
(52) U.S. Cl. .................. 248/281.11; 248/917; 248/919; 248/922; 248/280.11; 248/371; 248/297.11; 248/299.1; 248/324; 248/918; 248/921; 248/924; 248/274.1; 248/276.1; 248/282.1; 248/920; 248/923; 361/679.01; 361/679.02; 361/679.06
(58) Field of Classification Search .................. 248/917, 248/918, 919, 920, 921, 922, 923, 924, 280.11, 248/281.11, 371, 297.11, 299.1, 205.1, 324, 248/274.1, 276.1, 282.1; 361/681, 682
See application file for complete search history.

(56) References Cited

U.S. PATENT DOCUMENTS

| | | | | |
|---|---|---|---|---|
| 4,516,751 A * | 5/1985 | Westbrook | ................. | 248/279.1 |
| 4,768,744 A * | 9/1988 | Leeds et al. | ............... | 248/280.11 |
| 5,127,617 A * | 7/1992 | Bergetz | ...................... | 248/278.1 |
| 5,165,644 A * | 11/1992 | Allen | ........................... | 248/285.1 |
| 5,400,993 A * | 3/1995 | Hamilton | ................... | 248/279.1 |
| 5,405,117 A * | 4/1995 | Davis | .............................. | 248/333 |
| 5,797,568 A * | 8/1998 | Canton Gongora et al. | ........................... | 248/122.1 |
| 5,988,571 A * | 11/1999 | Ward et al. | ................. | 248/176.1 |
| 6,102,348 A * | 8/2000 | O'Neill | ...................... | 248/289.11 |
| 6,119,997 A * | 9/2000 | Van Lieshout | ................. | 248/323 |
| 6,135,402 A * | 10/2000 | Hatano et al. | ................. | 248/207 |
| 6,454,234 B1 * | 9/2002 | Westbrook | ...................... | 248/317 |
| 6,905,101 B1 * | 6/2005 | Dittmer | ....................... | 248/274.1 |
| 7,077,373 B1 * | 7/2006 | Hoebener et al. | ........... | 248/278.1 |

(Continued)

FOREIGN PATENT DOCUMENTS

DE 4442642 6/1996

(Continued)

OTHER PUBLICATIONS

CN Office Action issued Apr. 3, 2009 in CN Application No. 200710008397.9.

(Continued)

*Primary Examiner* — Nkeisha J Smith
(74) *Attorney, Agent, or Firm* — Stanzione & Kim, LLP

(57) ABSTRACT

A supporting device of a display unit includes a stationary bracket securable to a wall, a body coupling device to mount a body of the display unit thereto, and a plurality of connecting devices to connect the stationary bracket with the body coupling device, each connecting device having first and second ends thereof coupled to the stationary bracket and the body coupling device, respectively, to rotate in left and right directions, and having at least one point between the first and second ends thereof to bend in the left and right directions.

23 Claims, 10 Drawing Sheets

U.S. PATENT DOCUMENTS

| | | | |
|---|---|---|---|
| 7,398,950 B2 * | 7/2008 | Hung | 248/276.1 |
| 7,448,584 B2 * | 11/2008 | Chen et al. | 248/278.1 |
| 7,487,943 B1 * | 2/2009 | Gillespie | 248/282.1 |
| 2004/0262474 A1 * | 12/2004 | Boks et al. | 248/276.1 |
| 2006/0186294 A1 * | 8/2006 | Van Groesen et al. | 248/284.1 |
| 2006/0284037 A1 * | 12/2006 | Dittmer et al. | 248/285.1 |
| 2007/0252056 A1 * | 11/2007 | Novin | 248/205.1 |
| 2008/0001048 A1 * | 1/2008 | Woo et al. | 248/276.1 |
| 2008/0100996 A1 * | 5/2008 | Wang | 361/681 |
| 2008/0142658 A1 * | 6/2008 | Jurja | 248/220.21 |
| 2008/0253071 A1 * | 10/2008 | Stoelinga et al. | 361/681 |

FOREIGN PATENT DOCUMENTS

| | | |
|---|---|---|
| EP | 1586803 | 10/2005 |
| EP | 1586803 A2 * | 10/2005 |
| JP | 2004363788 | 12/2004 |
| KR | 2005-58738 | 6/2005 |
| KR | 2005-73654 | 7/2005 |

OTHER PUBLICATIONS

European Search Report issued Jul. 3, 2009 in EP Application No. 07075063.3.

* cited by examiner

SUPPORTING DEVICE OF A DISPLAY UNIT CAPABLE OF HORIZONTAL AND VERTICAL ROTATION

CROSS-REFERENCE TO RELATED APPLICATIONS

This application claims priority under 25 U.S.C. §119(a) from Korean Patent Application No. 2006-0026113 filed on Mar. 22, 2006 and No. 2006-132881 filed on Dec. 22, 2006 in the Korean Intellectual Property Office, the disclosure of which is incorporated herein by reference in its entirety.

BACKGROUND OF THE INVENTION

1. Field of the Invention

The present general inventive concept relates to a supporting device of a display unit, and, more particularly, to a supporting device to mount a display unit on a wall.

2. Description of the Related Art

Recently, with technological advances in the field of panel-type display units, display units such as liquid crystal displays and plasma display panels have a large screen size and a thin thickness such that they can be mounted on a wall of a room. In this regard, a supporting device to mount a display unit on the wall has been recently suggested.

In one example of a conventional supporting device disclosed in Korean Patent Laid-open Publication No. 2005-0073654, the supporting device can mount a display unit on a wall and adjust an installation angle of a display screen of the display unit. The display unit includes a body bracket to support a body of the display unit, a fixing bracket attached to the wall, and a bendable link assembly rotatably connected with the fixing bracket and the body bracket. The supporting device can adjust the installation angle of the screen in an upward and downward direction by bending and rotating the link assembly.

With the structure of the link assembly bent up or down by respective links adapted to rotate up or down in the link assembly, the supporting device can adjust a slant of the screen in the upward and downward direction. However, due to the structure of the link assembly, it is difficult to rotate the screen in left and right directions.

In another example of a conventional supporting device disclosed in Korean Patent Laid-open Publication No. 2005-0058738, the supporting device can mount a display unit on a wall, and adjust an angle of a display screen in a desired direction. The supporting device includes a first operation unit to adjust a left or right angle of a set-attaching bracket to which the display unit is coupled, and a second operation unit to allow an upper or lower end of the set-attaching bracket to be rotated forward and back. With this structure, the supporting device can adjust the angle of the screen in the upward and downward direction or in the left and right directions.

However, due to the structure of the conventional supporting device wherein a first upper point of the set-attaching bracket is supported by the first operation unit, and a second lower point of the set-attaching bracket is supported by the second operation unit, it is difficult to stably support a display unit having a large width. In particular, since the supporting device can suffer from sagging or shaking where there is a large separation between the set-attaching bracket and the wall, it is difficult to stably support the display unit, which has an increased size according to recent tendency of increasing the size thereof.

Furthermore, the conventional supporting device has a problem in that the structure of the first and second operation units makes it difficult to install the display unit so as to closely contact the wall. In other words, due to the structure of the conventional supporting device, the display unit is installed to the wall in a separated state.

SUMMARY OF THE INVENTION

Accordingly, it is an aspect of the present general inventive concept to provide a supporting device of a display unit, which can adjust an angle of a display screen by rotating the display unit in left and right directions while stably supporting the display unit.

It is another aspect of the present general inventive concept to provide a supporting device of a display unit, which mounts the display unit on a wall so as to be adjacent to the wall.

Additional aspects and/or utilities of the present general inventive concept will be set forth in part in the description which follows and, in part, will be apparent from the description, or may be learned by practice of the present general inventive concept.

The foregoing and/or other aspects and utilities of the present general inventive concept may be achieved by providing a supporting device of a display unit, including a stationary bracket securable to a wall, a body coupling device to mount a body of the display unit thereto, and a plurality of connecting devices to connect the stationary bracket with the body coupling device, each connecting device having first and second ends thereof coupled to the stationary bracket and the body coupling device, respectively, to rotate in left and right directions, and having at least one point between the first and second ends thereof to bend in the left and right directions.

The plurality of connecting devices may include a first connecting device coupled to a left side of the stationary bracket and a left side of the body coupling device, and a second connecting device coupled to a right side of the stationary bracket and a right side of the body coupling device and spaced apart from the first connecting device.

Each of the first and second connecting devices may include a first link having a first end coupled to the stationary bracket to rotate in the left and right directions and having a second end, and a second link having a first end coupled to the second end of the first link to rotate in the left and right directions and a second end coupled to the body coupling device to rotate in the left and right directions.

The body coupling device may include a supporting member coupled to the first and second connecting devices, and an upward-downward rotation member coupled to the supporting member to rotate in upward and downward directions and coupled to a rear side of the display unit.

The body coupling device may further include an extension member secured to the upward-downward rotation member and extending in a vertical direction, the extension member having upper and lower portions secured to upper and lower portions of the rear side of the display unit, respectively.

The upward-downward rotation member may include first and second upward-downward rotation members coupled to first and second sides of the supporting member, respectively, and the extension member may include first and second extension members secured to the first and second upward-downward rotation members, respectively.

Each of the first and second extension members may have hanging grooves formed at upper and lower portions thereof, to which protrusions on the rear side of the display unit are hung and secured.

The body coupling device may further include a supporting shaft extending through the extension member to couple the upward-downward rotation member to the supporting member.

The upward-downward rotation member may rotate upward and downward within a predetermined distance range with respect to the supporting member.

The supporting device may further include a first receipt part formed in the stationary bracket to receive the first link, a second receipt part form in the first link to receive the second link, and a third receipt part formed in the second link to receive the supporting member.

The stationary bracket, the first link, the second link, and the supporting member may be C-shaped steel members, and the first link has an external width narrower than an inner width of the stationary bracket, the second link has an external width narrower than an inner width of the first link, and the supporting member has an external width narrower than an inner width of the second link.

The body coupling device may include an extension member coupled to the upward-downward rotation members and having a first extension part extending downward and a second extension part bent forward from a lower portion of the first extension part, and a supporting plate mounted on the second extension part of the extension members to support a lower surface of the display unit.

The upward-downward rotation member may include first and second upward-downward rotation members coupled to first and second sides of the supporting member, respectively, and the extension member may include first and second extension members secured to the first and second upward-downward rotation members, respectively.

The supporting device may further include a fastener disposed on the supporting plate to fasten to the lower surface of the display unit.

The display unit may be a projection TV.

The foregoing and/or other aspects and utilities of the present general inventive concept may also be achieved by providing a supporting device of a display unit, including a stationary bracket securable to a wall, a body coupling device mountable to a body of the display unit, a first connecting device to connect left sides of the stationary bracket and the body coupling device with each other, and having a bending part to bend in left and right directions, and a second connecting device to connect right sides of the stationary bracket and the body coupling device with each other, and having a bending part to bend in the left and right directions.

The foregoing and/or other aspects and utilities of the present general inventive concept may also be achieved by providing a supporting device of a display unit, including a stationary bracket securable to a wall, a body coupling device mountable to a body of the display unit, a first connecting device to connect left sides of the stationary bracket and the body coupling device with each other; and a second connecting device to connect right sides of the stationary bracket and the body coupling device with each other, the first and second connecting devices independently adjusting a space between a rear side of the display unit and the wall.

The foregoing and/or other aspects and utilities of the present general inventive concept may also be achieved by providing a supporting device of a display unit, including a stationary bracket securable to a wall, a body coupling device mountable to a body of the display unit, connecting devices to connect the stationary bracket with the body coupling device, and having bending parts to bend in left and right directions, the stationary bracket including receipt parts to receive the connecting devices when the connecting devices are folded.

The foregoing and/or other aspects and utilities of the present general inventive concept may also be achieved by providing a mounting apparatus to mount a display device on a surface, the mounting apparatus including a stationary unit to be secured to the surface, a moveable unit to be secured to the display device and moveable along a first rotational axis in first and second directions, and a connecting unit to connect the stationary unit and the moveable unit to each other and moveable along a second rotational axis perpendicular to the first rotational axis in third and fourth directions.

The connecting unit may include a first linking unit to connect a first side of the stationary unit and a corresponding first side of the moveable unit with each other and rotatable around a third rotational axis parallel with the second rotational axis, and a second linking unit to connect a second side of the stationary unit and a corresponding second side of the moveable unit with each other and rotatable around a fourth rotational axis parallel with the second rotational axis, and the first linking unit and second linking unit may independently adjust a first distance between the first sides of the stationary unit and the moveable unit, and a second distance between the second sides of the stationary unit and the moveable unit, respectively.

The stationary unit may include a receiving portion to receive the connecting unit and a portion of the moveable unit therein. The stationary unit may include a receiving portion to receive the connecting unit and the moveable unit therein, such that a distance between the display unit and the surface corresponds to a width of the stationary unit when the connecting unit and the moveable unit are disposed in the receiving portion.

The moveable unit may include a first rotating unit to rotate a first side of the display unit along the first rotational axis in the first and second directions, and a second rotating unit to rotate a second side of the display unit along the first rotational axis in the first and second directions, and the first rotating unit and second rotating unit may independently adjust a first distance between the first side of the display unit and the surface, and a second distance between the second side of the display unit and the surface, respectively.

The moveable unit may include a fixed part connected to the connecting unit and having a first width, and a rotatable part rotatable around the fixed part along the first rotational axis and having a second width that is greater than the first width to limit a rotating distance thereof along the first rotational axis to be within a predetermined distance range.

BRIEF DESCRIPTION OF THE DRAWINGS

These and/or other aspects and advantages of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
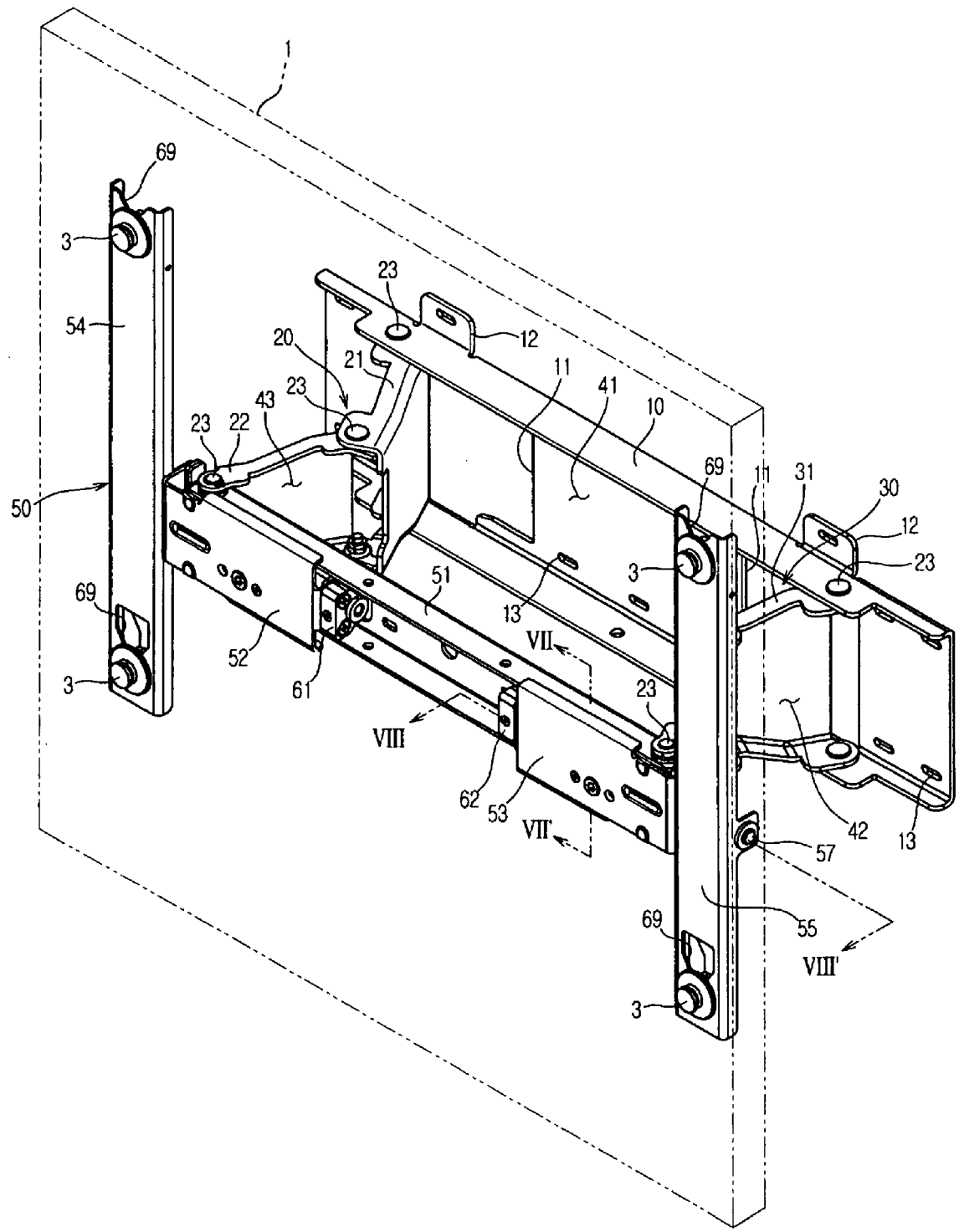
FIG. 1 is a perspective view illustrating a supporting device of a display unit, according to a first embodiment of the present general inventive concept.

Reference will now be made in detail to the embodiments of the present general inventive concept, examples of which are illustrated in the accompanying drawings, wherein like reference numerals refer to the like elements throughout the drawings. The embodiments are described below to explain the present general inventive concept by referring to the figures.

Figure 2:
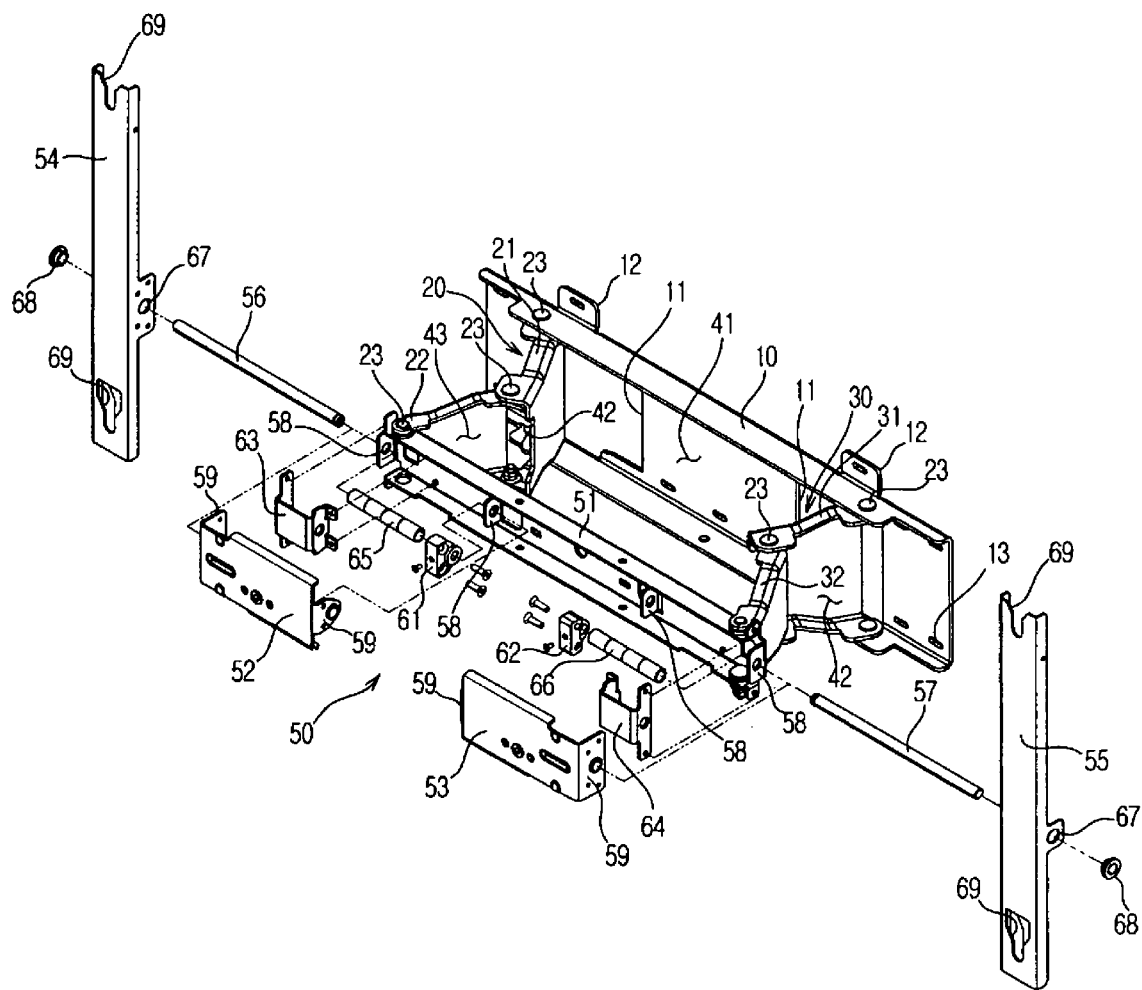
FIG. 2 is an exploded perspective view illustrating of the supporting device of FIG. 1.

FIGS. 1 to 8 illustrate a supporting device of a display unit according to a first embodiment of the present general inventive concept. The supporting device of the first embodiment is to support a panel type display unit, such as liquid crystal displays and plasma display panels. Referring to FIGS. 1 and 2, the supporting device may include a stationary bracket 10 to be secured to a wall 2 (see FIG. 3) of a room, a body coupling device 50 to be coupled to a rear side of a body 1 of the display unit, and first and second connecting devices 20 and 30 installed on first and second sides of the stationary bracket 10, respectively, to connect the stationary bracket 10 with the body coupling device 50.

The body coupling device 50 may include a supporting member 51 extending in a horizontal direction and having first and second ends connected with the first and second connecting devices 20 and 30, respectively. The body coupling device 50 may also include first and second upward-downward rotation members 52 and 53 connected with the first and second sides of the supporting member 51, respectively, to rotate in an upward and downward direction, and first and second extension members 54 and 55 extending in a vertical direction and being coupled to the first and second upward-downward rotation members 52 and 53, respectively. The first and second extension members 54 and 55 may be coupled to the rear side of the body 1 of the display unit to support the body 1.

The first connecting device 20 may include first and second links 21 and 22, which connect a left side of the stationary bracket 10 with a left side of the supporting member 51 to bend or rotate the left side of the supporting member 51. The first link 21 has a first end connected with the left side of the stationary bracket 10 to rotate in the left and right direction. The second link 22 has a first end coupled to a second end of the first link 21 to rotate in the left and right direction, and the second link 22 has a second end coupled to the left side of the supporting member 51 to rotate in the left and right direction. Coupling pins 23 are positioned at points where these components are coupled to each other so as to allow the components to rotate or pivot.

Similar to the first connecting device 20, the second connecting device 30 may include first and second links 31 and 32 to connect a right side of the stationary bracket 10 with a right side of the supporting member 51 to bend or rotate the right side of the supporting member 51. In this regard, although components are illustrated as being coupled to each other via the coupling pins in FIG. 1, coupling means are not limited to these configurations, and can be realized by bolts, rivets, and the like.

Figure 3:
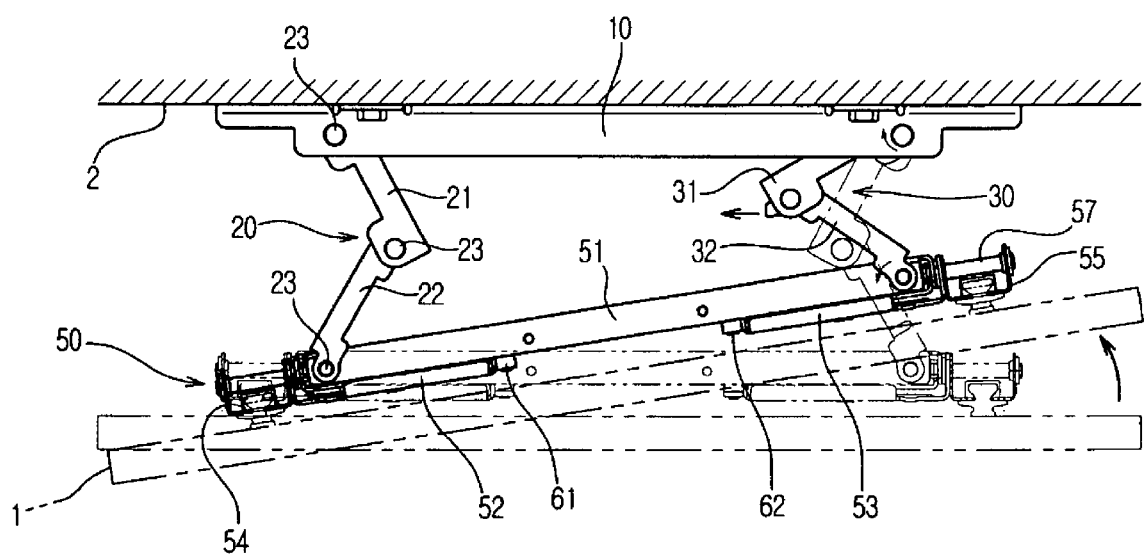
FIGS. 3 and 4 are plan views illustrating the supporting device of FIG. 1, which rotates the display unit in left and right directions.
Figure 4:
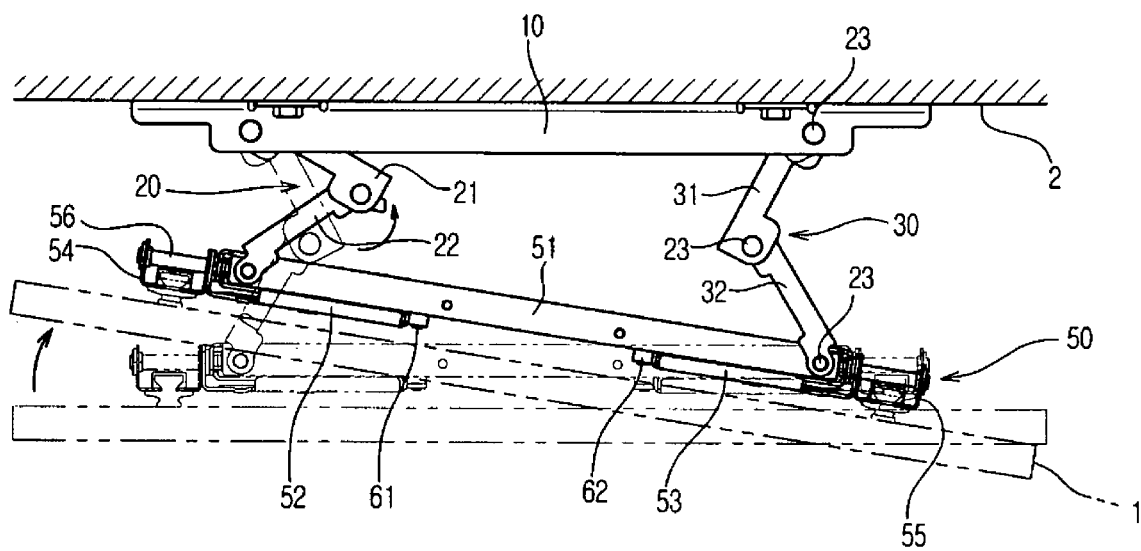

With this structure, the first link 21 (31) and the second link 22 (32) are rotatable in the left and right direction with respect to the stationary bracket 10 and the supporting member 51, and the first link 21 (31) and the second link 22 (32) are bent in the left and right direction around the coupling points, so that the first and second connecting devices 20 and 30 can independently adjust a distance between the rear side of the body 1 and the wall 2 at either side (left side or right side), as illustrated in FIGS. 3 and 4. In other words, since the body 1 is rotated in the left and right direction by bending or rotating the first and second connecting devices 20 and 30, it is possible to freely adjust an installation angle of a display screen in the left and right direction, and adjustments made using the first and second connecting devices 20 and 30 can be made independently.

Figure 6:
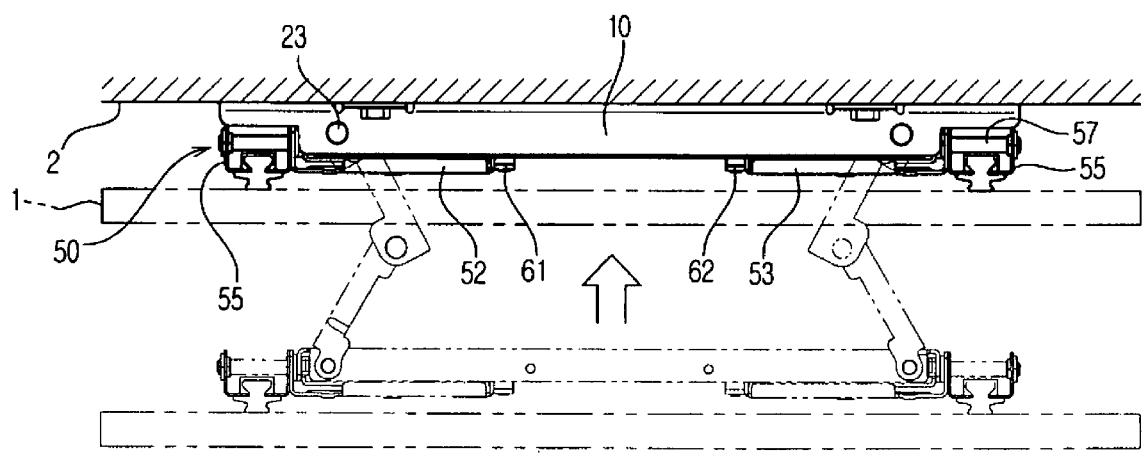
FIG. 6 is a plan view illustrating the supporting device of FIG. 1, which brings the display unit into close contact with a wall.

In addition, as illustrated in FIG. 6, the supporting device of the present embodiment can minimize a distance between the rear side of the body 1 and the wall 2 when the body 1 of the display unit is pushed towards the wall 2 by a user. To this end, as illustrated in FIG. 2, the stationary bracket 10 may be provided with a first receipt part 41 to receive the first link 21 (31) when the first link 21 (31) is folded, and the first link 21 (31) is provided with a second receipt part 42 to receive the second link 22 (32) when the second link 22 (32) is folded. Likewise, the second link 22 (32) is provided with a third receipt part 43 to receive the supporting member 51.

Figure 5:
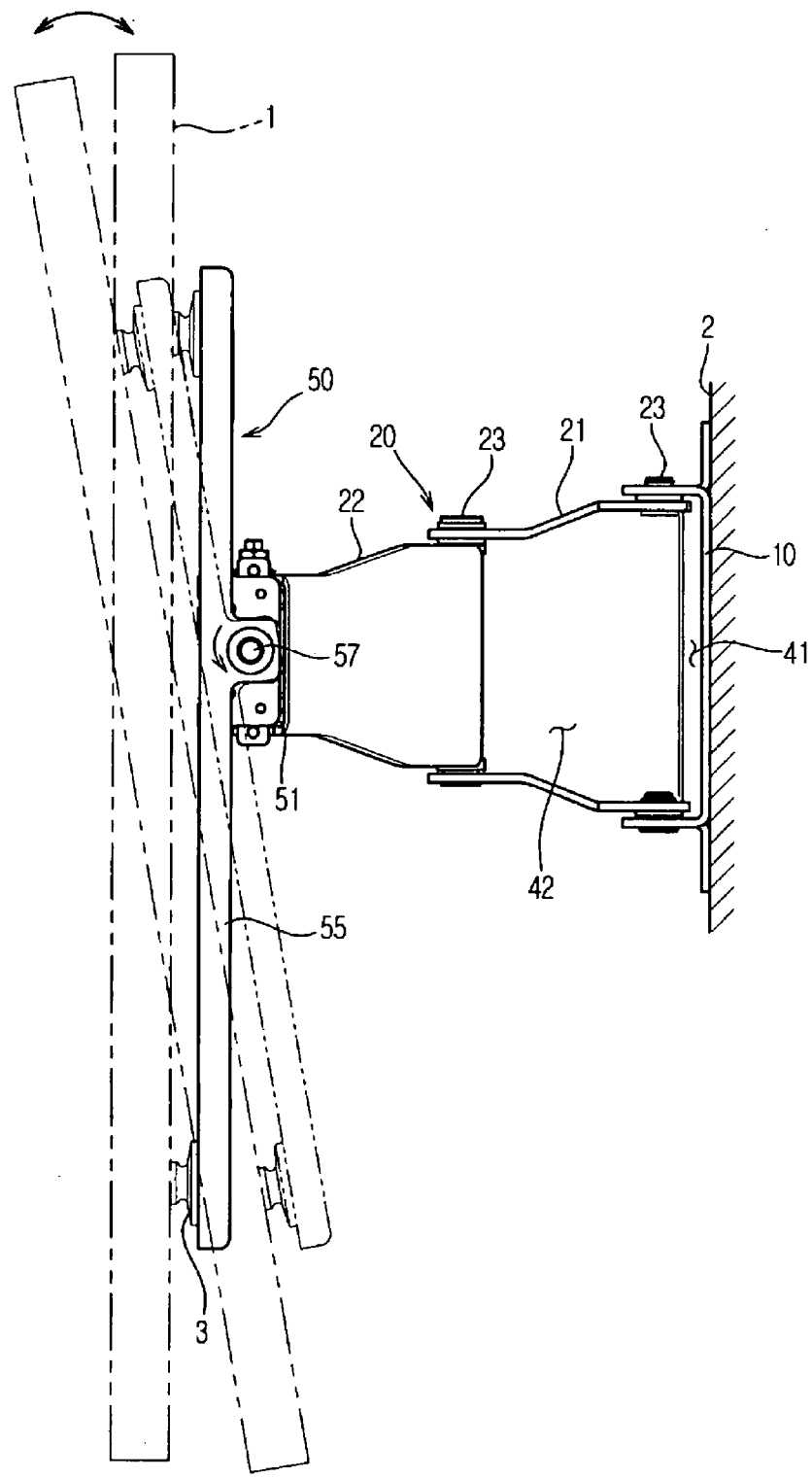
FIG. 5 is a side view illustrating the supporting device of FIG. 1, which rotates the display unit in an upward and downward direction.

Such a configuration can be realized by, for example, constituting the stationary bracket 10, the first links 21 and 31, the second links 22 and 32, and the supporting member 51 as C-shaped steel members. In addition, for this configuration, as illustrated in FIG. 5, the first link 21 (31) may have an external width narrower than an inner width of the stationary bracket 10, the second link 22 (32) has an external width narrower than an inner width of the first link 21 (31), and the supporting member 51 has an external width narrower than an inner width of the second link 22 (32). In other words, the widths are gradually decreased from the stationary bracket 10 to the supporting member 51. With this configuration, the first and second connecting devices 20 and 30, and the supporting member 51 may be folded and received in the stationary bracket 10, thereby minimizing the distance between the rear side of the body 1 and the wall 2. In addition, as illustrated in FIGS. 1 and 2, when openings 11 are formed in the stationary bracket 10 to receive the first link 21 (31), the distance between the rear side of the body 1 and the wall 2 can be further reduced by a thickness of the stationary bracket 10. In FIG. 2, reference numeral 12 indicates securing parts to secure the stationary bracket 10 to the wall 2, and reference numeral 13 indicates slots through which fastening screws may be fastened to secure the stationary bracket 10 to the wall 2.

In the body coupling device 50, the first and second upward-downward rotation members 52 and 53 are coupled to first and second sides of the supporting member 51 via first and second supporting shafts 56 and 57, respectively, so as to rotate in the upward and downward direction, as illustrated in FIG. 2. To this end, the supporting member 51 is provided at the first and second sides thereof with first shaft supporting parts 58 that have holes through which the first and second supporting shafts 56 and 57 pass, and each of the first and second upward-downward rotation members 52 and 53 is also provided at both sides thereof with second shaft supporting parts 59 that have holes through which the first and second supporting shafts 56 and 57 pass. Adjustments made using the first and second upward-downward rotation members 52 and 53 can be made independently.

In addition, the first and second supporting shafts 56 and 57 are provided at their ends with first and second shaft fixing members 61 and 62 inside the supporting member 51 to secure the first and second supporting shafts 56 and 57, respectively. The first and second shaft fixing members 61 and 62 secure the first and second supporting shafts 56 and 57 to prevent the supporting shafts 56 and 57 from being deviated from each other and are secured to the first and second upward-downward rotation members 52 and 53 to allow the first and second supporting shafts 56 and 57 to rotate along with the first and second upward-downward rotation members 52 and 53, respectively. In addition, the supporting member 51 is provided at both inner sides thereof with reinforcing members 63 and 64 and at both outer sides thereof with bushes 65 and 66 in order to stably support the first and second supporting shafts 56 and 57.

Figure 7:
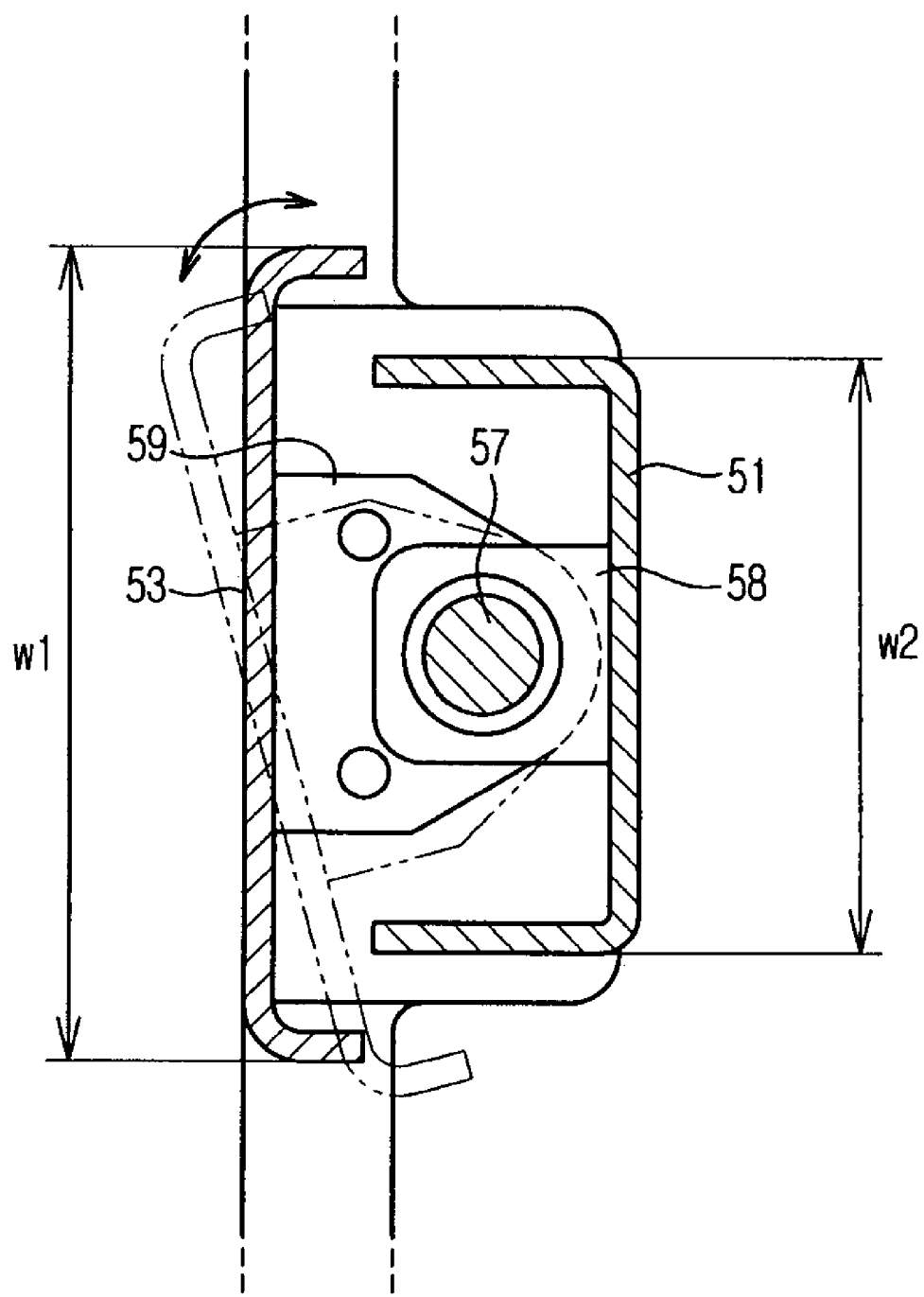
FIG. 7 is a cross-sectional view taken along line VII-VII' of FIG. 1.

As illustrated in FIG. 7, each of the first and second upward-downward rotation members 52 and 53 has a width W1 greater than a width W2 of the supporting member 51. As a result, when the first and second upward-downward rotation members 52 and 53 rotate upward, upper portions of the first and second upward-downward rotation members 52 and 53 are latched to an upper portion of the supporting member 51, and are prevented from being rotated any further. Likewise, when the first and second upward-downward rotation members 52 and 53 rotate downward, lower portions of the first and second upward-downward rotation members 52 and 53 are latched to a lower portion of the supporting member 51, and are prevented from being rotated any further. As such, according to the present embodiment, since upward and downward rotations of the first and second upward-downward rotation members 52 and 53 are restricted within a predetermined distance range, it is possible to restrict the upward and downward rotations of the body 1 within the predetermined range. This configuration is adapted to prevent an excessive rotation of the body 1.

Figure 8:
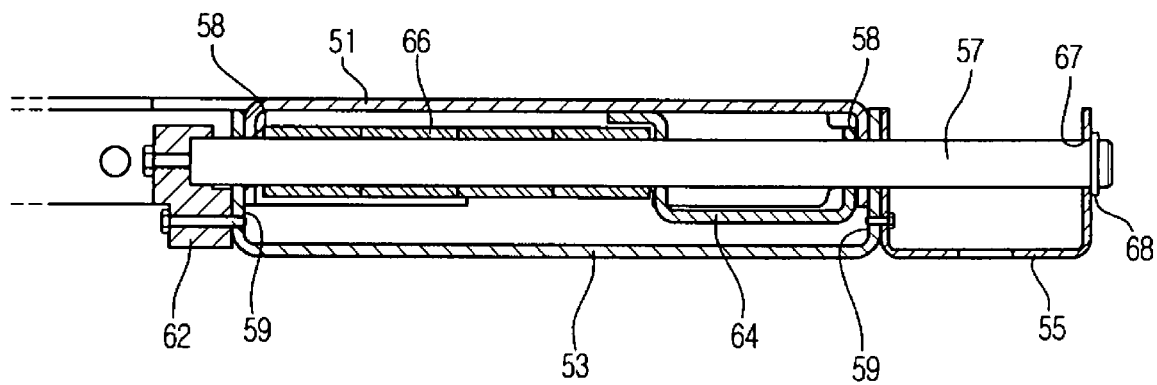
FIG. 8 is a cross-sectional view taken along line VIII-VIII' of FIG. 1.

The first and second extension members 54 and 55 are secured to lateral ends of the first and second upward-downward rotation members 52 and 53 via, for example, fastening screws, respectively, and extend in the vertical direction to stably support the rear side of the body 1. In addition, the first and second supporting shafts 56 and 57 extend through the first and second extension members 54 and 55, respectively, as illustrated in FIG. 8. To this end, the first and second extension members 54 and 55 are formed with holes 67 through which the first and second supporting shafts 56 and 57 pass, respectively. In addition, fixing members, such as snap rings 68, may be fastened to ends of the first and second supporting shafts 56 and 57, respectively.

With this structure, the first and second supporting shafts 56 and 57 can be positioned to support the first and second extension members 54 and 55 while penetrating the first and second extension members 54 and 55, respectively, so that the first and second extension members 54 and 55 are stably secured. In addition, the first and second extension members 54 and 55 can be separated from the first and second upward-downward rotation members 52 and 53, thereby allowing the supporting device to be minimized in volume when transporting or packaging the supporting device, and to be easily assembled when installing the supporting device.

As illustrated in FIGS. 1 and 2, upper and lower portions of the first and second extension members 54 and 55 may be formed with hanging grooves 69 to which coupling protrusions 3 on the rear side of the body 1 are hung, thereby allowing the display unit to be mounted on the wall 2. With this structure, the display unit can be easily mounted on the wall 2 simply by hanging the coupling protrusions 3 formed on the rear side of the body 1 to the hanging grooves 69 of the first and second extension members 54 and 55 with the supporting device installed on the wall 2.

Herein, although the structure of the supporting device is illustrated using the embodiment as described above, the present general inventive concept is not limited to this structure. For example, although the first and second upward-downward rotation members 52 and 53 are separately provided in the embodiment described above, the first and second upward-downward rotation members 52 and 53 may be provided as an integrated member. Likewise, the first and second supporting shafts 56 and 57 may be provided as an integrated supporting shaft. In addition, if the supporting device further includes additional components to securely couple the first and second extension members 54 and 55 to the first and second supporting shafts 56 and 57, respectively, while allowing the first and second extension members 54 and 55 to rotate with respect to the supporting member 51 in the upward and downward direction, the first and second upward-downward rotation members 52 and 53 can be omitted. In this case, it is necessary to provide components to restrict the upward and downward rotations of the first and second extension members 54 and 55 in place of the first and second upward-downward rotation members 52 and 53.

An operation and method of using the supporting device of the display unit according to an embodiment of the present general inventive concept will be described hereinafter.

When adjusting an angle of a display screen of the body 1 of the display unit by rotating the body 1 in left and right directions, an angle of the screen can be easily adjusted by pushing or pulling one or both sides of the body 1 in a desired direction, as illustrated in FIGS. 3 and 4. At this time, since the first and second connecting devices 20 and 30 are rotated or bent in the left and right direction, the body 1 can be rotated in the left and right direction. In other words, since it is possible to allow the first and second connecting devices 20 and 30 to be bent and rotated in different degrees with respect to each other and independently from each other, the angle of the screen can be easily adjusted. At this time, although the rear side of the body 1 is separated from the wall 2 and the body 1 has a heavy weight, the body 1 can be stably supported by the supporting device since the first and second connecting devices 20 and 30 securely support both sides of the rear side of the body 1 and may be formed of the C-shaped steel members.

When adjusting the angle of the screen by rotating the body 1 in the upward and downward direction, the angle of the screen can be easily adjusted by pushing or pulling upper and lower portions of the body 1 in a desired direction, as illustrated in FIG. 5. At this time, since the first and second upward-downward rotation members 52 and 53 are rotated in the upward and downward direction with respect to the supporting member 51, the body 1 can be rotated in the upward and downward direction. In addition, since the rotation distance of the first and second upward-downward rotation members 52 and 53 is limited to being within in a predetermined range, it is possible to prevent an excessive rotation of the body 1.

In addition, since the body 1 can be rotated in the left and right direction or in the upward and downward direction or separated from the wall 2 by pulling the body 1 in a front direction by the method described above, inspection of the rear side of the body 1 or a connection of electric wires thereto can be easily performed.

When bringing the body 1 into close contact with the wall 2, the body 1 is pushed towards the wall, as illustrated in FIG. 6. At this time, since the first and second connecting devices 20 and 30 are completely folded, and received in the stationary bracket 10 (e.g., within the first receipt part 41 of the stationary bracket 10), it is possible to minimize the distance between the rear side of the body 1 and the wall 2. Accordingly, the supporting device of the present embodiment can prevent the display unit from protruding from the wall while allowing the angle of the screen to be adjusted according to needs of a user, which allows a thin display unit to make good use of a small size thereof.

Figure 9:
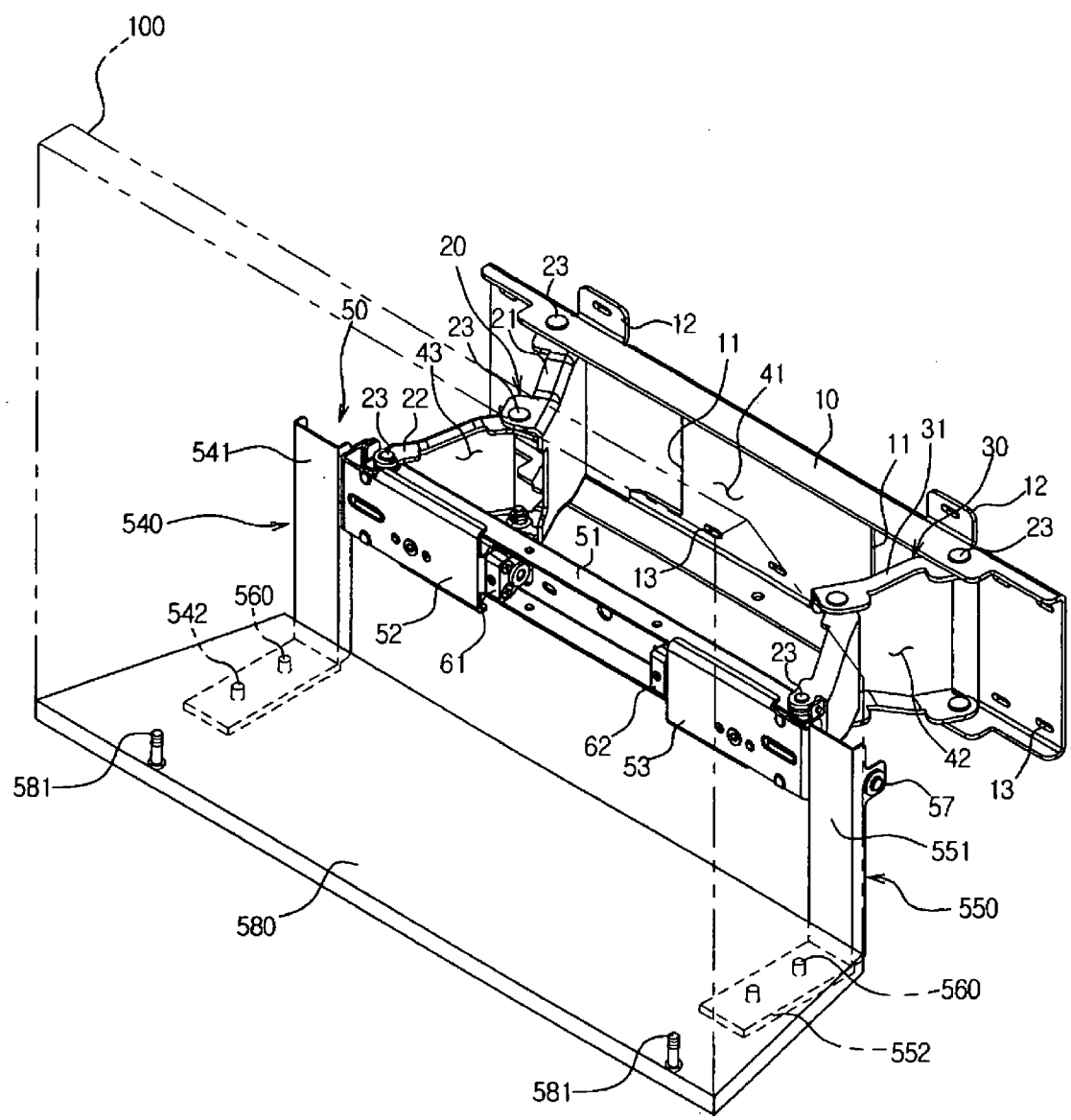
FIG. 9 is a perspective view illustrating a supporting device of a display unit, according to a second embodiment of the present general inventive concept.
Figure 10:
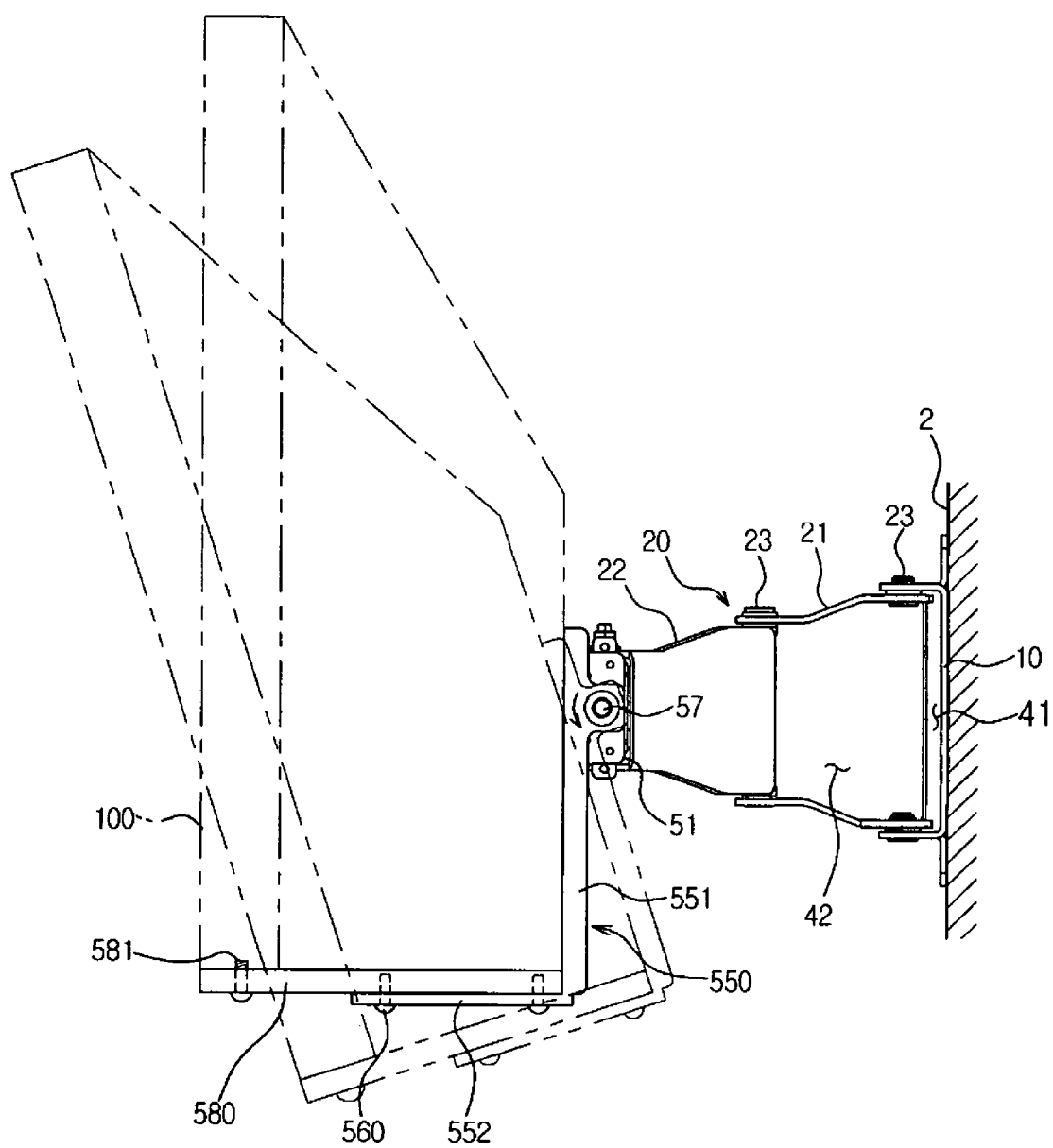
FIG. 10 is a side view illustrating the supporting device of FIG. 2, which rotates the display unit in upward and downward directions.

FIGS. 9 and 10 illustrate a supporting device of a display unit, according to a second embodiment of the present general inventive concept. The supporting device of the second embodiment is to mount a large display unit 100 such as a projection TV to a wall 2.

The supporting device of the second embodiment may include a first L-shaped extension member 540 coupled to a first upward-downward rotation member 52, a second L-shaped extension member 550 coupled to a second upward-downward rotation member 53, and a supporting plate 580 to support a lower surface of the display unit 100. Other configuration of the second embodiment is the same as that of the first embodiment, and thus detailed description thereof is omitted hereinafter.

The first extension member 540 may include a first extension part 541 that is secured to the first upward-downward rotation member 52 and extends downward a predetermined length, and a second extension part 542 that is bent forward from a lower end of the first extension part 541 to support the lower surface of the display unit 100. The second extension member 550 may also include a first extension part 551 and a second extension part 542.

The supporting plate 580 has a planar shape to support the display unit 100 having a large volume. The supporting plate 580 is mounted on the second extension part 542 of the first extension member 540 and the second extension part 552 of the second extension member 550, and fastened thereto by a plurality of screws 560. Furthermore, bolts and nuts 581 are fastened to the supporting plate 580 to secure the display unit 100 mounted on the supporting plate 580.

With the display unit 100 mounted on the upper surface of the supporting plate 580, the supporting device of the second embodiment can secure the lower surface of the display unit 100 on the supporting plate 580 via the bolts and nuts 581. Thus, the supporting device can stably support the display unit 100, such as projection TVs, which has a large volume. Of course, as in the first embodiment, the supporting device of the second embodiment can also adjust an installation angle of a display screen by rotating the display unit 100 in the upward and downward directions or in the left and right directions.

As apparent from the above description, according to embodiments of the present general inventive concept, one or more connecting devices connects a stationary bracket with a supporting member while supporting a rear side of a body of a display unit at both sides thereof, and can be bent or rotated in left and right directions, so that the supporting device can adjust an angle of a screen of the display unit by rotating the display unit in the left and right directions while stably supporting the display unit.

In addition, first and second upward-downward rotation members can be rotated in an upward and downward direction with respect to the supporting member, so that the angle of the screen is adjusted by rotating the display unit in the upward and downward direction.

Moreover, when bringing the body of the display unit into close contact with a wall to which the display unit is mounted, the connecting devices are completely received in a receipt part of the stationary bracket, so that the display unit can be closely mounted on the wall.

Furthermore, since first and second extension members can be separated from the first and second upward-downward rotation members, the supporting device can be minimized in volume when transporting or packaging the supporting device, thereby enabling transportation costs to be reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A supporting device of a display unit, comprising:
a stationary bracket securable to a wall;
a body coupling device to mount a body of the display unit thereto, and including an extension member mounted on the body and a support member connected to the extension member;
a rotation member directly on the support member and rotatable about an axis parallel to the support member to move the extension member with respect to the support member; and
a plurality of connecting devices to connect the stationary bracket with the body coupling device, each connecting device having first and second ends thereof coupled to the stationary bracket and the body coupling device, respectively, to rotate in left and right directions, and having at least one point between the first and second ends thereof to bend in the left and right directions, such that connections between the plurality of connecting devices and the body coupling device occur along multiple axes perpendicular to the axis of the rotation member,
wherein the plurality of connecting devices comprises:
a first connecting device coupled to a left side of the stationary bracket and a left side of the body coupling device; and
a second connecting device coupled to a right side of the stationary bracket and a right side of the body coupling device and spaced apart from the first connecting device,
wherein each of the first and second connecting devices comprises:
a first link having the first end coupled to the stationary bracket to rotate in the left and right directions and having a second end; and
a second link having a first end coupled to the second end of the first link to rotate in the left and right directions and the second end coupled to the body coupling device to rotate in the left and right directions, and
wherein the rotation member is an upward-downward rotation member and the body coupling device further comprises:
the supporting member coupled to the first and second connecting devices; and
the upward-downward rotation member coupled to the supporting member to rotate in upward and downward directions while being coupled to a rear side of the display unit.

2. The supporting device according to claim 1, wherein the extension member is secured to the upward-downward rotation member and extending in a vertical direction, the extension member having upper and lower portions capable of being secured to upper and lower portions of the rear side of the display unit, respectively.

3. The supporting device according to claim 2, wherein the upward-downward rotation member comprises first and second upward-downward rotation members coupled to first and second sides of the supporting member, respectively; and
the extension member comprises first and second extension members secured to the first and second upward-downward rotation members, respectively.

4. The supporting device according to claim 3, wherein each of the first and second extension members has hanging grooves formed at upper and lower portions thereof to which protrusions on the rear side of the display unit are capable of being hung and secured.

5. The supporting device according to claim 2, wherein the body coupling device further comprises:
a supporting shaft extending through the extension member to couple the upward-downward rotation member to the supporting member.

6. The supporting device according to claim 5, wherein the upward-downward rotation member rotates upward and downward within a predetermined distance range with respect to the supporting member.

7. The supporting device according to claim 1, further comprising:
a first receipt part formed in the stationary bracket to receive the first link;
a second receipt part formed in the first link to receive the second link; and
a third receipt part formed in the second link to receive the supporting member.

8. The supporting device according to claim 7, wherein the stationary bracket, the first link, the second link, and the supporting member are C-shaped steel members; and
the first link has an external width narrower than an inner width of the stationary bracket, the second link has an external width narrower than an inner width of the first link, and the supporting member has an external width narrower than an inner width of the second link.

9. The supporting device according to claim 1, wherein the extension member having a first extension part extending downward from the upward-downward rotation member and a second extension part bent forward from a lower portion of the first extension part; and
a supporting plate mounted on the second extension part of the extension member to support a lower surface of the display unit.

10. The supporting device according to claim 9, wherein the upward-downward rotation member comprises first and second upward-downward rotation members coupled to first and second sides of the supporting member, respectively; and
the extension member comprises first and second extension members secured to the first and second upward-downward rotation members, respectively.

11. The supporting device according to claim 10, further comprising:
a fastener disposed on the supporting plate to fasten to the lower surface of the display unit.

12. The supporting device according to claim 11, wherein the display unit is a projection TV.

13. A supporting device of a display unit, comprising:
a stationary bracket securable to a wall;
a body coupling device to mount a body of the display unit thereto, and including an extension member mounted on the body and a support member connected to the extension member, and a rotation member rotatably mounted to the support member to move the extension member with respect to the support member; and
a plurality of connecting devices to connect the stationary bracket with the body coupling device,
wherein the plurality of connecting devices comprises: a first connecting device coupled to a left side of the stationary bracket and a left side of the body coupling device; and a second connecting device coupled to a right side of the stationary bracket and a right side of the body coupling device and spaced apart from the first connecting device,
each of the first and second connecting devices comprises: a first link having a first end coupled to the stationary bracket to rotate in the left and right directions and having a second end; and a second link having a first end coupled to the second end of the first link to rotate in the left and right directions and a second end coupled to the body coupling device to rotate in the left and right directions, and
wherein the rotation member is an upward-downward rotation member and the body coupling device comprises:
the supporting member coupled to the first and second connecting devices; and
the upward-downward rotation member coupled to the supporting member to rotate in upward and downward directions while being coupled to a rear side of the display unit.

14. A supporting device of a display unit, comprising:
a stationary bracket securable to a wall;
a body coupling device mountable to a body of the display unit, and including an extension member mounted on the body and a support member connected to the extension member;
a rotation member directly on the support member and rotatable about an axis parallel to the support member to move the extension member with respect to the support member;
a first connecting device to connect left sides of the stationary bracket and the body coupling device with each other, and having a bending part to bend in left and right directions; and
a second connecting device to connect right sides of the stationary bracket and the body coupling device with each other, and having a bending part to bend in the left and right directions,
such that the first connecting device and second connecting device are connected at separate connecting locations to the body coupling device with the support member between the connecting locations,
wherein the rotation member is an upward-downward rotation member and the body coupling device comprises:
the supporting member coupled to the first and second connecting device; and the upward-downward rotation member coupled to the supporting member to rotate in upward and downward directions to be coupled to a rear side of the display unit.

15. The supporting device according to claim 14, wherein the upward-downward rotation member comprises multiple upward-downward rotation members and all multiple upward-downward rotation members are coupled to the supporting member.

16. A supporting device of a display unit, comprising:
a stationary bracket securable to a wall;
a body coupling device mountable to a body of the display unit, and including an extension member mounted on the body and a support member connected to the extension member;
a rotation member directly on the support member and rotatable about an axis parallel to the support member to move the extension member with respect to the support member;
a first connecting device to connect left sides of the stationary bracket and the body coupling device with each other; and
a second connecting device to connect right sides of the stationary bracket and the body coupling device with each other,
wherein the first and second connecting devices independently adjust a space between a rear side of the display unit and the wall,
such that connections between the first and second connecting devices and the body coupling device occur along multiple axes perpendicular to the axis of the rotation member,
wherein the rotation member is an upward-downward rotation member and the body coupling device comprises: the supporting member coupled to the first and second connecting device; and the upward-downward rotation member coupled to the supporting member to rotate in upward and downward directions to be coupled to a rear side of the display unit.

17. A supporting device of a display unit, comprising:
a stationary bracket securable to a wall;
a body coupling device mountable to a body of the display unit, and including two separate extension members mounted on the body and a support member connected to the extension members;
a rotation member directly on the support member and rotatable about an axis parallel to the support member to move the extension members with respect to the support member;
connecting devices to connect the stationary bracket with the body coupling device, and having bending parts to bend in left and right directions,
wherein the stationary bracket comprises receipt parts to receive the connecting devices when the connecting devices are folded, and
the rotation member is an upward-downward rotation member and the body coupling device comprises: the supporting member coupled to the first and second connecting device; and the upward-downward rotation member coupled to the supporting member to rotate in upward and downward directions to be coupled to a rear side of the display unit.

18. A mounting apparatus to mount a display device on a surface, the mounting apparatus comprising:
a stationary unit to be secured to the surface;
a moveable unit to be secured to the display device and moveable along a first rotational axis in first and second directions, and including a first rotating unit and second rotating unit mounted on the display device and a fixed part connected to the first and second rotating units;
a rotatable part directly on the fixed part and rotatable about an axis parallel to the fixed part to move the first rotating unit and second rotating unit with respect to the fixed part; and
a connecting unit to connect the stationary unit and the moveable unit to each other and moveable along a second rotational axis perpendicular to the first rotational axis in third and fourth directions; wherein the connecting unit includes a first linking unit coupled to a left side of the stationary unit and a left side of the moveable unit, and includes a second linking unit coupled to a right side of the stationary unit and a right side of the moveable unit, and wherein the first and second linking units are spaced apart from one another.

19. The mounting apparatus according to claim 18, wherein the connecting unit comprises:
the first linking unit rotatable around a third rotational axis parallel with the second rotational axis; and
the second linking unit rotatable around a fourth rotational axis parallel with the second rotational axis,
wherein the first linking unit and second linking unit independently adjust a first distance between the first sides of the stationary unit and the moveable unit, and a second distance between the second sides of the stationary unit and the moveable unit, respectively.

20. The mounting apparatus according to claim 18, wherein the stationary unit comprises:
a receiving portion to receive the connecting unit and a portion of the moveable unit therein.

21. The mounting apparatus according to claim 18, wherein the stationary unit comprises:
a receiving portion to receive the connecting unit and the moveable unit therein, such that a distance between the display unit and the surface corresponds to a width of the stationary unit when the connecting unit and the moveable unit are disposed in the receiving portion.

22. The mounting apparatus according to claim 18, wherein the moveable unit comprises:
a first rotating unit to rotate a first side of the display unit along the first rotational axis in the first and second directions; and
a second rotating unit to rotate a second side of the display unit along the first rotational axis in the first and second directions,
wherein the first rotating unit and second rotating unit independently adjust a first distance between the first side of the display unit and the surface, and a second distance between the second side of the display unit and the surface, respectively.

23. The mounting apparatus according to claim 18, wherein the moveable unit comprises:
the fixed part connected to the connecting unit and having a first width; and
the rotatable part rotatable around the fixed part along the first rotational axis and having a second width that is greater than the first width to limit a rotating distance thereof along the first rotational axis to be within a predetermined distance range.

* * * * *